United States Patent
Cole et al.

(10) Patent No.: US 10,155,197 B2
(45) Date of Patent: Dec. 18, 2018

(54) DIESEL OXIDATION CATALYST HAVING A CAPTURE REGION FOR EXHAUST GAS IMPURITIES

(71) Applicant: Johnson Matthey Public Limited Company, London (GB)

(72) Inventors: Kieran John Cole, Royston (GB); Lee Alexander Gilbert, Royston (GB); Robert Hanley, Royston (GB); Colin Russell Newman, Royston (GB); Calum Robertson, Royston (GB); Gudmund Smedler, Gothenburg (SE); Isabel Zoe Tingay, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/364,565

(22) Filed: Nov. 30, 2016

(65) Prior Publication Data
US 2017/0151532 A1    Jun. 1, 2017

(30) Foreign Application Priority Data

Nov. 30, 2015 (GB) .................................. 1521123.8

(51) Int. Cl.
*B01J 21/04* (2006.01)
*B01J 21/06* (2006.01)
(Continued)

(52) U.S. Cl.
CPC ....... *B01D 53/944* (2013.01); *B01D 53/9468* (2013.01); *B01D 53/9472* (2013.01);
(Continued)

(58) Field of Classification Search
CPC . B01J 21/04; B01J 21/06; B01J 21/063; B01J 21/066; B01J 21/08; B01J 21/12; B01J 21/16; B01J 23/10; B01J 23/42; B01J 23/44; B01J 23/46; B01J 23/56; B01J 23/63; B01J 23/8906; B01J 23/892;
(Continued)

(56) References Cited

U.S. PATENT DOCUMENTS

| | | |
|---|---|---|
| 7,767,176 B2 * | 8/2010 | Patchett ............. B01D 53/9418 423/213.5 |
| 8,257,659 B2 | 9/2012 | Simon, III et al. |

(Continued)

FOREIGN PATENT DOCUMENTS

| | | |
|---|---|---|
| DE | 0638349 A1 | 2/1995 |
| DE | 102011089371 A1 | 6/2012 |

(Continued)

*Primary Examiner* — Cam N. Nguyen
(74) *Attorney, Agent, or Firm* — Gary D. Mangels

(57) ABSTRACT

An oxidation catalyst is described for treating an exhaust gas produced by a diesel engine, wherein the oxidation catalyst comprises: a substrate; a capture material for capturing at least one phosphorus containing impurity and/or at least one sulfur containing impurity in the exhaust gas produced by the diesel engine; and a catalytic region disposed on the substrate; wherein the catalytic region comprises a catalytic material comprising a platinum group metal (PGM) selected from the group consisting of platinum (Pt), palladium (Pd) and a combination of platinum (Pt) and palladium (Pd).

21 Claims, 4 Drawing Sheets

(51) Int. Cl.

| | | |
|---|---|---|
| *B01J 21/08* | (2006.01) | |
| *B01J 21/12* | (2006.01) | |
| *B01J 21/16* | (2006.01) | |
| *B01J 23/10* | (2006.01) | |
| *B01J 23/42* | (2006.01) | |
| *B01J 23/44* | (2006.01) | |
| *B01J 23/46* | (2006.01) | |
| *B01J 23/56* | (2006.01) | |
| *B01J 23/63* | (2006.01) | |
| *B01J 23/89* | (2006.01) | |
| *B01J 29/76* | (2006.01) | |
| *B01J 35/00* | (2006.01) | |
| *B01J 35/04* | (2006.01) | |
| *B01D 53/94* | (2006.01) | |
| *F01N 3/08* | (2006.01) | |
| *F01N 3/10* | (2006.01) | |
| *F01N 3/28* | (2006.01) | |
| *B01J 37/02* | (2006.01) | |

(52) U.S. Cl.
CPC ......... *B01D 53/9481* (2013.01); *B01J 23/44* (2013.01); *B01J 29/763* (2013.01); *B01J 35/0006* (2013.01); *B01J 35/04* (2013.01); *B01J 37/0244* (2013.01); *B01J 37/0246* (2013.01); *F01N 3/0807* (2013.01); *F01N 3/0828* (2013.01); *F01N 3/103* (2013.01); *F01N 3/2828* (2013.01); *B01D 2253/108* (2013.01); *B01D 2253/116* (2013.01); *B01D 2255/1021* (2013.01); *B01D 2255/1023* (2013.01); *B01D 2255/50* (2013.01); *B01D 2255/902* (2013.01); *B01D 2255/903* (2013.01); *B01D 2255/9022* (2013.01); *B01D 2255/9025* (2013.01); *B01D 2255/9035* (2013.01); *B01D 2255/9155* (2013.01); *B01D 2257/30* (2013.01); *B01D 2257/55* (2013.01); *B01D 2258/012* (2013.01); *F01N 2510/0682* (2013.01); *F01N 2510/0684* (2013.01); *F01N 2570/04* (2013.01); *F01N 2570/08* (2013.01); *Y02T 10/20* (2013.01)

(58) Field of Classification Search
CPC .... B01J 23/8926; B01J 23/894; B01J 29/763; B01J 35/0006; B01J 35/04; B01D 53/944; B01D 53/9468; B01D 53/9472
See application file for complete search history.

(56) References Cited

U.S. PATENT DOCUMENTS

| | | | | |
|---|---|---|---|---|
| 8,293,182 | B2* | 10/2012 | Boorse | B01D 53/9468 422/180 |
| 8,540,952 | B2* | 9/2013 | Swallow | B01D 53/9418 423/213.2 |
| 8,637,426 | B2* | 1/2014 | Hoke | B01D 53/945 502/333 |
| 8,795,617 | B2* | 8/2014 | Swallow | B01D 53/9418 423/213.2 |
| 9,034,286 | B2* | 5/2015 | Bergeal | B01D 53/945 422/180 |
| 9,057,310 | B2* | 6/2015 | Bergeal | B01D 53/945 |
| 9,259,684 | B2* | 2/2016 | Blakeman | B01J 35/0006 |
| 9,333,461 | B2* | 5/2016 | Castagnola | B01J 35/0006 |
| 9,527,034 | B2* | 12/2016 | Bergeal | B01D 53/945 |
| 9,527,035 | B2* | 12/2016 | Bergeal | B01D 53/945 |
| 9,579,603 | B2* | 2/2017 | Sonntag | B01J 35/0006 |
| 9,597,636 | B2* | 3/2017 | Sonntag | B01J 35/0006 |
| 9,611,773 | B2* | 4/2017 | Brown | B01D 53/9422 |
| 2003/0021745 | A1 | 1/2003 | Chen | |
| 2007/0014705 | A1 | 1/2007 | Chen | |
| 2010/0186375 | A1 | 7/2010 | Kazi et al. | |
| 2015/0217282 | A1 | 8/2015 | Fedeyko et al. | |
| 2016/0236147 | A1* | 8/2016 | Chen | B01D 53/944 |

FOREIGN PATENT DOCUMENTS

| | | |
|---|---|---|
| DE | 112016000032 | 3/2017 |
| GB | 2388059 A | 11/2003 |
| GB | 2486810 A | 6/2012 |
| GB | 2544837 A | 6/2016 |
| GB | 2535274 A | 8/2016 |
| JP | 2007107495 A | 4/2007 |
| JP | 2013146706 A | 8/2013 |
| JP | 201566516 | 4/2015 |
| WO | 9947260 | 9/1999 |
| WO | 199947260 A1 | 9/1999 |
| WO | 2007077462 | 7/2007 |
| WO | 2007077462 A1 | 7/2007 |
| WO | 2011080525 | 7/2011 |
| WO | 2011080525 A1 | 7/2011 |
| WO | 2015189680 A1 | 12/2015 |

* cited by examiner

DIESEL OXIDATION CATALYST HAVING A CAPTURE REGION FOR EXHAUST GAS IMPURITIES

FIELD OF THE INVENTION

The invention relates to an oxidation catalyst and an exhaust system for treating an exhaust gas produced by an internal combustion, particularly a diesel engine. The invention further relates to methods and uses of the oxidation catalyst, the exhaust system or the region for capturing at least one phosphorus containing impurity and/or at least one sulfur containing impurity in the exhaust gas produced by the diesel engine. The invention also relates to a vehicle comprising the oxidation catalyst or the exhaust system.

BACKGROUND TO THE INVENTION

Diesel engines produce an exhaust gas that contains a variety of pollutants that are the subject of environmental legislation around the world. These pollutants include carbon monoxide (CO), unburned hydrocarbons (HCs), oxides of nitrogen ($NO_x$) and particulate matter (PM). To meet permissible levels of pollutants that may be emitted into the atmosphere set by legislation, exhaust systems for treating the exhaust gas produced by a diesel engine generally contain several emissions control devices. In such exhaust systems, the exhaust gas is usually passed to a first emissions control device that is able to oxidise carbon monoxide (CO) and the unburned hydrocarbons (HCs) that are present in the gas.

In addition to the pollutants mentioned above, the exhaust gas may contain impurities that originate from the diesel engine lube oil and/or the specific type of fuel that has been used. These impurities typically include an element from the p-block of the periodic table, particularly from the third row (period 3) of the periodic table, such as phosphorus and sulfur. Some of these impurities may also form pollutants that are the subject of environmental legislation.

The first emissions control device in an exhaust system to encounter the exhaust gas produced by a diesel engine, particularly for heavy duty applications (e.g. trucks, buses, off-road vehicles, trains, tractors, ships), is typically a diesel oxidation catalyst (DOC). The DOCs used in heavy duty applications are generally subjected to prolonged periods of continuous use during each journey or drive cycle and are expected to have a relatively long lifetime. Any impurities in the exhaust gas are often deposited in the DOC (the first emissions control device encountered by the exhaust gas) and accumulate over its lifetime. These impurities degrade the performance of the DOC because they can poison catalytically active species, permanently occupy sites on the surface of the catalyst or chemically alter the catalyst composition of the DOC. As a result of this degradation in performance, it may be necessary to replace a DOC after it has been used in a vehicle that has travelled for several hundreds of thousands of kilometers.

SUMMARY OF THE INVENTION

The invention provides an oxidation catalyst for treating an exhaust gas produced by a diesel engine. The oxidation catalyst comprises a substrate; a capture material for capturing at least one phosphorus containing impurity and/or at least one sulfur containing impurity in the exhaust gas produced by the diesel engine; and a catalytic region disposed on the substrate, wherein the catalytic region comprises a catalytic material comprising a platinum group metal (PGM) selected from the group consisting of platinum (Pt), palladium (Pd) and a combination of platinum (Pt) and palladium (Pd).

The inventors have developed a capture material for trapping or capturing at least one phosphorus containing impurity and/or at least one sulfur containing impurity in the exhaust gas produced by the diesel engine. The capture material reduces or prevents degradation of the oxidative activity of the oxidation catalyst, particularly toward carbon monoxide (CO) and/or unburned hydrocarbons (HCs). The oxidation catalyst may also maintain similar levels of NO oxidation activity and/or maintain a similar level of exotherm generation (usually by combustion of HCs) over its lifetime. The capture material may also prevent any phosphorus or sulfur containing impurity from degrading the performance of an emissions control device that is downstream of the DOC, such as a selective catalytic reduction (SCR) catalyst or a selective catalytic reduction filter (SCRF™) catalyst, by trapping the impurity within the DOC.

The invention also relates to an exhaust system for treating an exhaust gas produced by a diesel engine. The exhaust system comprises the oxidation catalyst of the invention.

The invention further provides a vehicle. The vehicle comprises a diesel engine and either an oxidation catalyst or an exhaust system of the invention.

The invention also relates to several uses and methods.

A first use aspect of the invention relates to the use of a capture material or a capture region comprising the capture material (e.g. in or as part of an oxidation catalyst) for capturing or trapping at least one phosphorus containing impurity and/or at least one sulfur containing impurity in an exhaust gas produced by a diesel engine. An oxidation catalyst comprises the capture material or the capture region; a substrate; and a catalytic region disposed on the substrate, wherein the catalytic region comprises a catalytic material comprising a platinum group metal (PGM) selected from the group consisting of platinum (Pt), palladium (Pd) and a combination of platinum (Pt) and palladium (Pd).

A second use aspect relates to the use of an oxidation catalyst to treat an exhaust gas produced by a diesel engine. The oxidation catalyst is an oxidation catalyst in accordance with the invention.

A third use aspect relates to the use of a capture material or a capture region comprising the capture material (e.g. in or as part of an oxidation catalyst) for reducing or preventing poisoning of a catalytic region or a catalytic material, preferably the catalytic material, by at least one phosphorus containing impurity and/or at least one sulfur containing impurity in an exhaust gas produced by a diesel engine. An oxidation catalyst comprises the capture material or the capture region; a substrate; and the catalytic region disposed on the substrate, wherein the catalytic region comprises the catalytic material comprising a platinum group metal (PGM) selected from the group consisting of platinum (Pt), palladium (Pd) and a combination of platinum (Pt) and palladium (Pd).

A first method aspect of the invention relates to a method of capturing or trapping at least one phosphorus containing impurity and/or at least one sulfur containing impurity in an exhaust gas produced by a diesel engine.

A second method aspect of the invention relates to a method of treating an exhaust gas produced by a diesel engine.

Each of the above method or use aspects of the invention comprise the step of passing an exhaust gas produced by a diesel engine through an exhaust system comprising the oxidation catalyst of the invention.

A third method aspect of the invention relates to a method of reducing or preventing poisoning of a catalytic region or a catalytic material, preferably the catalytic material, of an oxidation catalyst by at least one phosphorus containing impurity and/or at least one sulfur containing impurity in an exhaust gas produced by a diesel engine. The method comprises:

(i) passing the exhaust gas through an oxidation catalyst, wherein the oxidation catalyst is an oxidation catalyst in accordance with the first aspect of the invention;

(ii) capturing or trapping at least one phosphorus containing impurity and/or at least one sulfur containing impurity in the capture region or the capture material.

BRIEF DESCRIPTION OF THE DRAWINGS

FIG. 2 shows an oxidation catalyst having a capture layer (2) disposed on a catalytic layer (3). The catalytic layer (3) is disposed on a substrate (1).

FIG. 3 shows an oxidation catalyst having a capture layer (2) disposed on a catalytic region. The catalytic region has a first catalytic zone (3) and a second catalytic zone (4), which are disposed on a substrate (1).

FIG. 4 shows an oxidation catalyst having a capture zone (2) disposed on a substrate (1) at the inlet end of the oxidation catalyst. There is catalytic zone (3) at the outlet end of the oxidation catalyst.

FIG. 5 shows an oxidation catalyst having a capture zone (2) disposed at an inlet end of the substrate (1). There is first catalytic zone (3) disposed on a second catalytic zone (4), which are disposed at an outlet end of the substrate.

FIG. 6 shows an oxidation catalyst having a catalytic layer (3) disposed on a substrate (1). There is capture zone (2) at the inlet end of the substrate, which is disposed on the catalytic layer (3).

FIG. 7 shows an oxidation catalyst having a capture zone (2) disposed on a substrate at an inlet end. The capture region (2) overlaps a catalytic zone (3). The catalytic zone (3) is disposed at an outlet end of the substrate.

FIG. 8 shows an oxidation catalyst having a capture zone (2) and a first catalytic zone (3), which are disposed on a second catalytic layer (4). The second catalytic layer (4) is disposed on a substrate (1).

FIG. 9 shows an oxidation catalyst having a capture zone (2) disposed on a first catalytic layer (3). The first catalytic layer (3) is disposed on a second catalytic layer (4). The second catalytic layer (4) is disposed on a substrate (1).

FIGS. 9 and 10 are schematic drawings of oxidation catalysts of the invention.

DETAILED DESCRIPTION OF THE INVENTION

Figure 1:
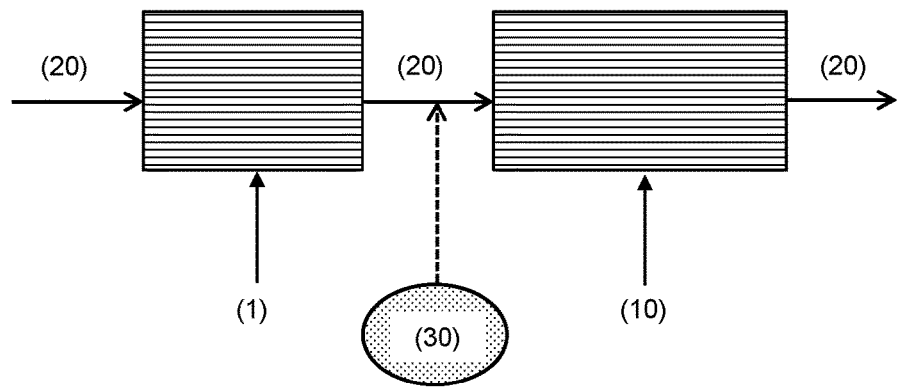
FIG. 1 is a schematic drawing showing an exhaust system arrangement of the invention. Exhaust gas (20) passes through an oxidation catalyst (1) of the invention having a capture material. The oxidation catalyst may have a configuration as shown in FIGS. 2 to 9. After exhaust gas (20) has passed through the oxidation catalyst (1), it passes through a second emissions control device (10), such as a catalysed soot filter (CSF), a diesel particulate filter (DPF), a selective catalytic reduction (SCR) catalyst or a selective catalytic reduction filter (SCRF™) catalyst. If the second emissions control device (10) is an SCR or SCRF™ catalyst and active SCR is to be performed, then the exhaust system may comprise a source of ammonia (30) for introduction into the exhaust gas. For passive SCR, the source of ammonia (30) may not be present.

The present invention will now be further described. The following sections relate to features of the invention, particularly features of the oxidation catalyst of the invention, and define each feature in more detail. Each part or aspect of the oxidation catalyst (e.g. the capture material, the catalytic region, the oxidation catalyst arrangement, the substrate etc.) may be combined with any other part or aspect of the oxidation catalyst unless clearly indicated to the contrary. In particular, any feature indicated as being preferred or advantageous may be combined with any other feature or features indicated as being preferred or advantageous.

Capture Material

The invention relates to a capture material for capturing or trapping at least one phosphorus containing impurity and/or at least one sulfur containing impurity in the exhaust gas produced by a diesel engine. The capture material may be included as part of a capture region, which can be arranged in a variety of ways to trap or capture at least one phosphorus containing impurity and/or at least one sulfur containing impurity. Several materials have been found to be suitable for trapping or capturing at least one phosphorus containing impurity and/or at least one sulfur containing impurity.

In general, impurities in an exhaust gas that are brought into contact with a catalyst are able to impair its performance by degrading its activity typically by competitive adsorption onto active sites or by forming a compound or alloy with the active platinum group metal sites. The poisoning effect of these impurities can be reversible or irreversible. When the effect is reversible, then strategies may be employed to remove the impurity to regenerate the activity of the catalyst.

The capture material of the present invention may (i) trap or capture at least one phosphorus containing impurity; or (ii) trap or capture at least one sulfur containing impurity; or (iii) trap or capture at least one phosphorus containing impurity and at least one sulfur containing impurity.

The mechanism of phosphorus poisoning of a catalytic material in a diesel oxidation catalyst is not completely known. When a conventional diesel fuel is used, the main or only source of phosphorus in an exhaust gas produced by a diesel engine is the lubricating oil(s), hydraulic oil(s) or other lubricant(s) for the diesel engine. For example, zinc dialkyldithiophosphate (ZDDP) is a common source of phosphorus containing impurities in an exhaust gas because it is typically included in such oils and lubricants as an antiwear and corrosion-inhibiting additive. When a biodiesel is used, then the fuel itself may provide a source of phosphorus in addition to the lubricating oil(s) for the engine.

The composition of the phosphorus containing species in an exhaust gas is unclear, but it is believed that a significant proportion of these species will be oxides of phosphorus (e.g. $P_2O_5$). It is, however, well-known that the phosphorus containing species can accumulate in a catalytic material of a diesel oxidation catalyst in the form of phosphates. These phosphates can, for example, alter the chemical composition of the refractory oxide that is used to support a platinum group metal in the catalytic material. The accumulation of phosphate in such materials can change the nature of the interaction between the support material and the platinum group metal (PGM). It can also "lock" the oxidation state of the metal ion present in a refractory oxide component of the catalytic material.

Sulfur containing impurities, such as organosulfur compounds, are naturally present in diesel fuel. When the diesel fuel is combusted in an engine operating under lean conditions, the sulfur containing impurities are typically converted into oxides of sulfur, which can cause significant deactivation of catalysts due to the formation of strong metal-sulfur bonds.

Some countries have imposed limits on the amount of sulfur that may be present in diesel fuel. For example, in Europe the "Euro IV" standard specified a maximum of 50 ppm of sulfur in diesel fuel for most highway vehicles. Even when low sulfur containing diesel fuels are used, the sulfur containing impurities can accumulate within a DOC over time and can lead to a significant deterioration in performance, especially for DOCs that are used in heavy duty applications.

The inventors have discovered several types of materials that can capture or trap at least one phosphorus containing impurity and/or at least one sulfur containing impurity in an exhaust gas produced by a diesel engine. In addition to being able to capture or trap a phosphorus containing impurity and/or at least one sulfur containing impurity, there may be other advantages associated with each type of material.

The expression "capture material for capturing at least one phosphorus containing impurity and/or at least one sulfur containing impurity in an exhaust gas produced by a diesel engine" is referred to herein below by the abbreviated term "capture material".

In a first capture material embodiment, the capture material comprises, or consists essentially of, a molecular sieve.

The molecular sieve is typically composed of aluminium, silicon, and/or phosphorus. The molecular sieve generally has a three-dimensional arrangement (e.g. framework) of $SiO_4$, $AlO_4$, and/or $PO_4$ that are joined by the sharing of oxygen atoms. The molecular sieve may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

Typically, the molecular sieve has an aluminosilicate framework, an aluminophosphate framework or a silico-aluminophosphate framework. It is preferred that the molecular sieve has an aluminosilicate framework. When the molecular sieve has an aluminosilicate framework, then the molecular sieve is preferably a zeolite.

The molecular sieve may be selected from a small pore molecular sieve (i.e. a molecular sieve having a maximum ring size of eight tetrahedral atoms), a medium pore molecular sieve (i.e. a molecular sieve having a maximum ring size of ten tetrahedral atoms) and a large pore molecular sieve (i.e. a molecular sieve having a maximum ring size of twelve tetrahedral atoms). It is preferred that the molecular sieve is a medium pore molecular sieve or a large pore molecular sieve. More preferably, the molecular sieve is a large pore molecular sieve. It is believed that phosphorus species are more easily able to access the inner structure of molecular sieves having a larger pore sizes thereby facilitating their capture.

When the molecular sieve is a medium pore molecular sieve (e.g. a medium pore zeolite), then preferably the medium pore molecular sieve has a Framework Type selected from the group consisting of MFI, FER, MWW and EUO, more preferably MFI.

When the molecular sieve is a large pore molecular sieve (e.g. a large pore zeolite), then preferably the large pore molecular sieve has a Framework Type selected from the group consisting of CON, BEA, FAU, MOR and EMT, more preferably BEA.

Each of the aforementioned three-letter codes represents a framework type in accordance with the "IUPAC Commission on Zeolite Nomenclature" and/or the "Structure Commission of the International Zeolite Association".

The molecular sieve typically has a silica to alumina molar ratio (SAR) of 10 to 200 (e.g. 10 to 40), such as 10 to 100, more preferably 15 to 80 (e.g. 15 to 30). The SAR generally relates to a molecular having an aluminosilicate framework (e.g. a zeolite) or a silico-aluminophosphate framework, preferably an aluminosilicate framework (e.g. a zeolite).

The molecular sieve may comprise (e.g. contain) a base metal.

Typically, the base metal is supported on the molecular sieve. For example, the base metal may be loaded onto and supported on the molecular sieve, such as by ion-exchange.

In general, the molecular sieve may be a metal-substituted molecular sieve (e.g. metal-substituted molecular sieve having an aluminosilicate or an aluminophosphate framework). The metal of the metal-substituted molecular sieve may be a base metal (e.g. the molecular sieve is a base metal-substituted molecular sieve). Thus, the molecular sieve containing the base metal may be a base metal-substituted molecular sieve. For the avoidance of doubt, the term "metal-substituted" embraces the term "ion-exchanged".

When the molecular sieve is a base metal-substituted molecular sieve, particularly an ion-exchanged base metal substituted molecular sieve, it is preferred that the base metal-substituted molecular sieve is an over-exchanged base-metal substituted molecular sieve. An over-exchanged base-metal substituted molecular sieve comprises a base metal ion-exchanged molecular sieve (e.g. a stoichiometric base metal ion-exchanged molecular sieve) and base metal that is not ion-exchanged with the molecular sieve. In general, it is only possible to perform ion-exchange at the alumina sites of the molecular sieve. For a molecular sieve comprising a given amount of alumina, there is a stoichiometric limit to the amount of ion-exchange that can be performed.

Alternatively, the molecular sieve may be substantially free of, or does not comprise, a base metal, such as a base metal described below.

In the first capture material embodiment, the base metal may be selected from the group consisting of iron (Fe), copper (Cu), nickel (Ni) and a combination of two or more thereof. It is preferred that the base metal is selected from the group consisting of iron (Fe), copper (Cu), and a combination of iron (Fe) and copper (Cu). The base metal may be iron (Fe). More preferably, the base metal may be copper (Cu).

In the first capture material embodiment, it may be preferable that the capture material is substantially free of a platinum group metal (PGM). Thus, the capture material may not comprise a platinum group metal (PGM).

Oxidation Catalyst Arrangements

The invention includes oxidation catalysts where the capture material and the catalytic region are arranged in a variety of ways.

As a general feature of the invention, it is preferred that the capture material is present in a region that is arranged to contact the exhaust gas before the exhaust gas has contacted and/or passed through another, separate catalytic region, such as the catalytic region described below. The capture material is able to protect the catalytic region from becoming poisoned by, or accumulating, a phosphorus containing impurity and/or a sulfur containing impurity.

In the first to third oxidation catalyst arrangements below, the catalytic region preferably does not comprise the capture material.

Generally, in the first to third oxidation catalyst arrangements, the oxidation catalyst comprises a substrate, a capture region comprising the capture material and the catalytic region disposed on the substrate. It is preferred that the capture region is arranged to contact the exhaust gas before the exhaust gas has contacted and/or passed through the catalytic region.

For the avoidance of doubt, the capture region and the catalytic region have different compositions.

The catalytic region is typically disposed or supported on the substrate. The catalytic region may be directly disposed or supported on the substrate (i.e. the catalytic region is in contact with a surface of the substrate).

The capture region may be:
(a) disposed or supported on the catalytic region; and/or
(b) directly disposed or supported on the substrate [i.e. the capture region is in contact with a surface of the substrate]; and/or
(c) in contact with the catalytic region [i.e. the capture region is adjacent to, or abuts, the catalytic region].

In general, the capture region is disposed or supported on a plurality of channel walls within the substrate (i.e. each channel wall within the substrate). The capture region is typically also disposed or supported on a plurality of channel walls of the substrate (i.e. each channel wall within the substrate).

In the first to third oxidation catalyst arrangements, the capture region is arranged to contact the exhaust gas as it enters the oxidation catalyst. The catalytic region may be arranged or oriented to contact exhaust gas after the capture region. In the first to third oxidation catalyst arrangements, the capture region is arranged to contact the exhaust gas as it enters the oxidation catalyst and optionally the catalytic region is arranged or oriented to contact exhaust gas after the capture region.

First Arrangement

In a first oxidation catalyst arrangement, the capture region is a capture layer. The catalytic region may be (i) a catalytic layer or (ii) first catalytic zone and a second catalytic zone.

The capture layer typically extends for substantially an entire length of the substrate, particularly the entire length of the channels of a monolith substrate. See, for example, FIGS. 2 and 3.

The capture layer may consist essentially of the capture material (e.g. any one of the first to seventh capture material embodiments described above) or a plurality of capture materials (e.g. any two of the first to seventh capture material embodiments described above), such as a mixture of two or more capture materials. It is preferred that the capture layer consists essentially of the capture material (i.e. a single capture material).

The catalytic region may be a catalytic layer, preferably a single catalytic layer.

When the catalytic region is a catalytic layer (see FIG. 2), then the capture layer may be disposed on the catalytic layer, and the catalytic layer may be disposed or supported (e.g. directly disposed or supported) on the substrate. Alternatively, the catalytic layer may be disposed on the capture layer, and the capture layer may be disposed or supported (e.g. directly disposed or supported) on the substrate.

When the catalytic region is a catalytic layer, then the catalytic layer preferably extends for substantially an entire length of the substrate, particularly the entire length of the channels of a monolith substrate.

It is preferred that the capture layer is disposed or supported (e.g. directly disposed or supported) on the catalytic layer, and the catalytic layer is disposed or supported (e.g. directly disposed or supported) on the substrate. In this arrangement, the exhaust gas is brought into contact with the capture layer before it is brought into contact with the catalytic layer.

The catalytic region may be a first catalytic layer and a second catalytic layer, such as a second catalytic layer as herein defined below. The catalytic layer described above is referred to below as the "first catalytic layer".

It is preferred that the capture layer is disposed or supported (e.g. directly disposed or supported) on the first catalytic layer. More preferably, the first catalytic layer is disposed or supported (e.g. directly disposed or supported) on the second catalytic layer, and the second catalytic layer is disposed or supported (e.g. directly disposed or supported) on the substrate.

When the oxidation catalyst comprises a second catalytic layer, then it is preferred that the first catalytic layer comprises a support material, which is sulfur tolerant, such as described below.

Figure 3:
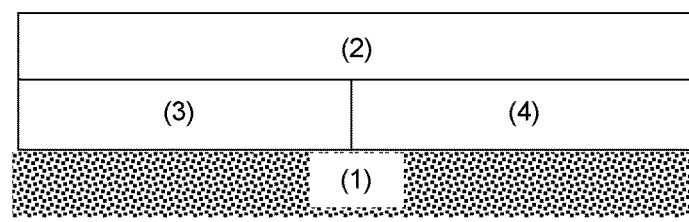
Figure 4:
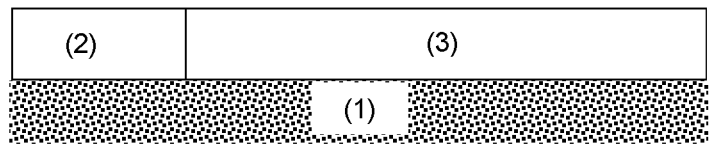

In the first oxidation catalyst arrangement, the catalytic region may be a first catalytic zone and a second catalytic zone (see FIG. 3). The capture layer is preferably disposed or supported on both the first catalytic zone and the second catalytic zone, more preferably the capture layer is directly disposed or supported on both the first catalytic zone and the second catalytic zone.

The first catalytic zone and the second catalytic zone are preferably disposed or supported on the substrate, more preferably directly disposed or supported on the substrate.

The first catalytic zone typically has a length of 2.5 to 90% (e.g. 2.5 to 50% or 50 to 90%) of the length of the substrate, preferably 5 to 80% (e.g. 5 to 45% or 45 to 80%), particularly 10 to 75% (e.g. 10 to 40% or 40 to 75%) of the length of the substrate, more preferably 15 to 65% (e.g. 15 to 30% or 30 to 65%) of the length of the substrate.

Typically, the second catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

It is generally preferred that the first catalytic zone is disposed or supported upstream of the second catalytic zone. More preferably, the first catalytic zone is disposed or supported at or near an inlet end of the substrate.

The first catalytic zone may adjoin the second catalytic zone. Preferably, the first catalytic zone is in contact with the second catalytic zone. When the first catalytic zone adjoins the second catalytic zone or the first catalytic zone is in contact with the second catalytic zone, then the first catalytic zone and the second catalytic zone may be disposed or supported on the substrate as a layer (e.g. a single layer). Thus, a layer (e.g. a single) may be formed on the substrate when the first and second catalytic zones adjoin or are in contact with one another.

The first catalytic zone may be separate from the second catalytic zone. There may be a gap (e.g. a space) between the first catalytic zone and the second catalytic zone.

Alternatively, the first catalytic zone may overlap the second catalytic zone. An end portion or part of the first catalytic zone may be disposed or supported on the second catalytic zone. The first catalytic zone generally only partly overlaps the second catalytic zone.

In general, it may be preferable that the first catalytic zone comprises a support material, which is sulfur tolerant, such as described below.

Second Arrangement

In a second oxidation catalyst arrangement, the capture region is a capture zone.

In general, the capture zone has a length of 25 mm.

Additionally or alternatively, the capture zone typically has a length of 2.5 to 90% (e.g. 2.5 to 50% or 50 to 90%) of the length of the substrate, preferably 5 to 80% (e.g. 5 to 45% or 45 to 80%), particularly 10 to 75% (e.g. 10 to 40% or 40 to 75%) of the length of the substrate, more preferably 15 to 65% (e.g. 15 to 30% or 30 to 65%) of the length of the substrate.

The capture zone may consist essentially of the capture material (e.g. any one of the first to seventh capture material embodiments described above) or a plurality of capture materials (e.g. any two of the first to seventh capture material embodiments described above), such as a mixture of two or more capture materials. It is preferred that the capture zone preferably consists essentially of the capture material (i.e. a single capture material).

The capture zone is preferably disposed or supported at or near an inlet end of the substrate (see, for example, FIGS. 4 to 7). More preferably, the capture zone is directly disposed or supported at or near an inlet end of the substrate.

The catalytic region may be:
(i) a catalytic layer (see FIG. 6); or
(ii) a catalytic zone (see FIGS. 4 and 7); or
(iii) a first catalytic zone and a second catalytic zone (see FIG. 5); or
(iv) a first catalytic zone and a second catalytic layer (see FIG. 8); or
(v) a first catalytic layer and a second catalytic layer (see FIG. 9).

In (i), the catalytic region is a catalytic layer, preferably a single catalytic layer. The capture zone is typically disposed or supported (e.g. directly disposed or supported) on the catalytic layer (see FIG. 6).

Figure 6:
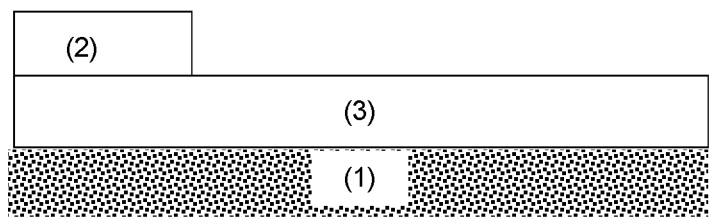
Figure 7:
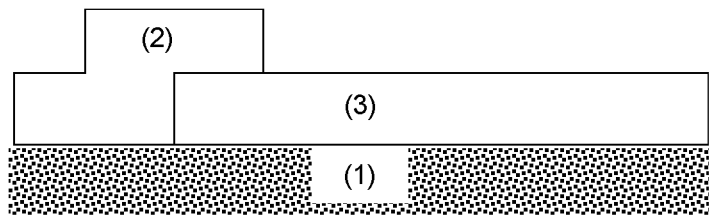

The capture zone is preferably disposed or supported on the catalytic layer at or near an inlet end of the substrate (see FIG. 6). More preferably, the capture zone is directly disposed or supported on the catalytic layer at or near an inlet end of the substrate. In this arrangement, the exhaust gas is brought into contact with the capture zone before it is brought into contact with most of the catalytic layer.

When the catalytic region is a catalytic layer, then the catalytic layer preferably extends for substantially an entire length of the substrate, particularly the entire length of the channels of a monolith substrate.

The catalytic layer is preferably disposed or supported (e.g. directly disposed or supported) on the substrate.

When the capture zone is disposed or supported on the catalytic layer, it is preferred that the entire length of the capture zone is disposed or supported on the catalytic layer. The length of the capture zone is less than the length of the catalytic layer.

Alternatively, in (ii), the catalytic region is a catalytic zone, preferably a single catalytic zone.

The catalytic zone is preferably disposed or supported (e.g. directly disposed or supported) on the substrate. More preferably, the catalytic zone is disposed or supported (e.g. directly disposed or supported) at or near an outlet end of the substrate.

It is preferred that the capture zone is disposed or supported (e.g. directly disposed or supported) on the substrate. More preferably, the capture zone is disposed or supported (e.g. directly disposed or supported) at or near an inlet end of the substrate.

Typically, the catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

It is generally preferred that the capture zone is disposed or supported upstream of the catalytic zone. In this arrangement, the exhaust gas is brought into contact with the capture zone before it is brought into contact with the catalytic zone.

The catalytic zone may adjoin the capture zone. Preferably, the catalytic zone is in contact with the capture zone. When the catalytic zone adjoins the capture zone or the catalytic zone is in contact with the capture zone, then the catalytic zone and the capture zone may be disposed or supported on the substrate as a layer (e.g. a single layer). Thus, a layer (e.g. a single) may be formed on the substrate when the catalytic and capture zones adjoin or are in contact with one another (see FIG. 4).

Additionally, the capture zone may overlap the catalytic zone. An end portion or part of the capture zone may be disposed or supported on the catalytic zone (see FIG. 7). The capture zone may only partly overlap the catalytic zone.

In an alternative arrangement of (ii), the catalytic zone may be separate from the capture zone. There may be a gap (e.g. a space) between the catalytic zone and the capture zone. The gap between the catalytic zone and the capture zone may be less than 10 mm (e.g. relatively small) or 10 mm.

In (iii), the catalytic region is a first catalytic zone and a second catalytic zone.

The first catalytic zone is typically disposed or supported (e.g. directly disposed or supported) on the second catalytic zone. Preferably, the second catalytic zone is disposed or supported (e.g. directly disposed or supported) on the substrate.

Figure 5:
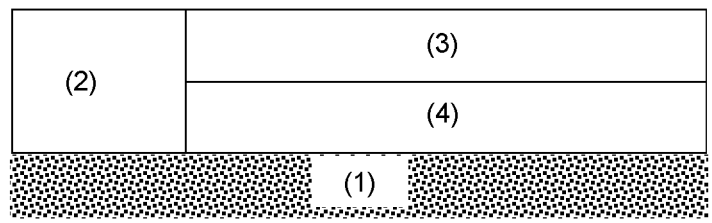

It is preferred the first catalytic zone and the second catalytic zone are both disposed or supported at or near an outlet end of the substrate (see FIG. 5).

Typically, the capture zone is disposed or supported (e.g. directly disposed or supported) on the substrate.

It is preferred that the capture zone is disposed or supported (e.g. directly disposed or supported) at or near an inlet end of the substrate. In this arrangement, the exhaust gas is brought into contact with the capture zone before it is brought into contact with both the first and second catalytic zones.

Typically, the first catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

The second catalytic zone typically has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

When the catalytic region is a first catalytic zone and a second catalytic zone, it is preferred that the first catalytic zone comprise a support material, which is sulfur tolerant, such as described below.

In (iv), the catalytic region is a first catalytic zone and a second catalytic layer.

Figure 8:
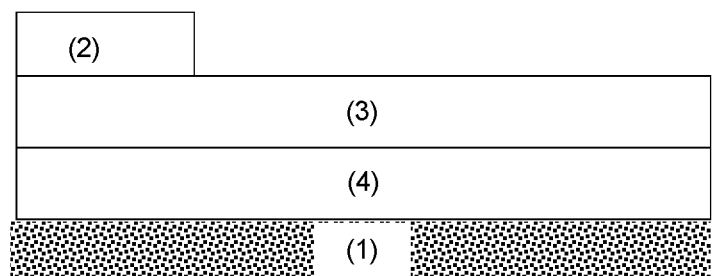
Figure 9:
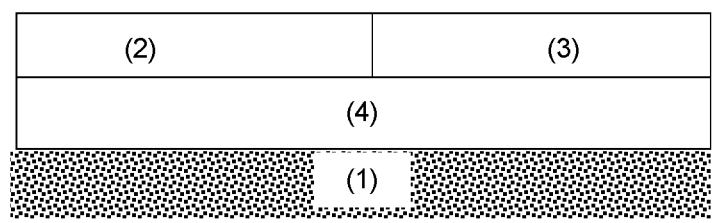

The capture zone is preferably disposed or supported on the second catalytic layer at or near an inlet end of the substrate (see FIG. 8). More preferably, the capture zone is directly disposed or supported on the second catalytic layer at or near an inlet end of the substrate. In this arrangement, the exhaust gas is brought into contact with the capture layer before it is brought into contact with most of the second catalytic layer.

The second catalytic layer preferably extends for substantially an entire length of the substrate, particularly the entire length of the channels of a monolith substrate.

The second catalytic layer is preferably disposed or supported (e.g. directly disposed or supported) on the substrate.

When the capture zone is disposed or supported on the second catalytic layer, it is preferred that the entire length of the capture zone is disposed or supported on the second catalytic layer. The length of the capture zone is less than the length of the second catalytic layer.

The first catalytic zone is preferably disposed or supported (e.g. directly disposed or supported) on the second catalytic layer. More preferably, the first catalytic zone is disposed or supported (e.g. directly disposed or supported) at or near an outlet end of the substrate (e.g. on the second catalytic layer).

Typically, the first catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

It is generally preferred that the capture zone is disposed or supported upstream of the first catalytic zone. In this arrangement, the exhaust gas is brought into contact with the capture zone before it is brought into contact with the first catalytic zone.

The first catalytic zone may adjoin the capture zone. Preferably, the first catalytic zone is in contact with the capture zone. When the first catalytic zone adjoins the capture zone or the first catalytic zone is in contact with the capture zone, then the first catalytic zone and the capture zone may be disposed or supported on the substrate as a layer (e.g. a single layer). Thus, a layer (e.g. a single) may be formed on the substrate when the first catalytic and capture zones adjoin or are in contact with one another.

Additionally, the capture zone may overlap the first catalytic zone. An end portion or part of the capture zone may be disposed or supported on the first catalytic zone. The capture zone may only partly overlap the catalytic zone.

Alternatively, the first catalytic zone may be separate from the capture zone. There may be a gap (e.g. a space) between the first catalytic zone and the capture zone. The gap between the first catalytic zone and the capture zone may be less than 10 mm (e.g. relatively small) or 10 mm.

In (v), the catalytic region is a first catalytic layer and a second catalytic layer.

The capture zone is preferably disposed or supported on the first catalytic layer at or near an inlet end of the substrate. More preferably, the capture zone is directly disposed or supported on the first catalytic layer at or near an inlet end of the substrate. In this arrangement, the exhaust gas is brought into contact with the capture zone before it is brought into contact with most of the first catalytic layer.

The first catalytic layer may be disposed or supported (e.g. directly disposed or supported) on the second catalytic layer. The second catalytic layer may be disposed or supported (e.g. directly disposed or supported) on the substrate.

The first catalytic layer preferably extends for substantially an entire length of the substrate, particularly the entire length of the channels of a monolith substrate.

The second catalytic layer preferably extends for substantially an entire length of the substrate, particularly the entire length of the channels of a monolith substrate.

In general, when the oxidation catalyst comprises a second catalytic layer, then it is preferred that the first catalytic layer comprise a support material, which is sulfur tolerant, such as described below.

Third Arrangement

Figure 10:
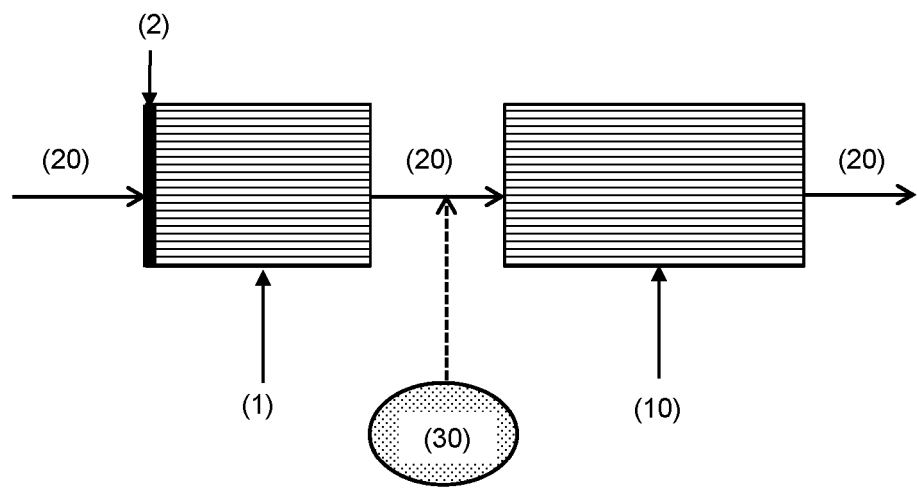
FIG. 10 is a schematic drawing showing an exhaust system arrangement of the invention. Exhaust gas (20) passes through an oxidation catalyst (1) of the invention, which has a capture material (2) disposed at an inlet end surface of the substrate. After exhaust gas (20) has passed through the oxidation catalyst (1), it may pass through a second emissions control device (10), such as a catalysed soot filter (CSF), a diesel particulate filter (DPF), a selective catalytic reduction (SCR) catalyst or a selective catalytic reduction filter (SCRF™) catalyst. If the second emissions control device (10) is an SCR or SCRF™ catalyst and active SCR is to be performed, then the exhaust system may comprise a source of ammonia (30) for introduction into the exhaust gas. For passive SCR, the source of ammonia (30) may not be present.
Figure 11:
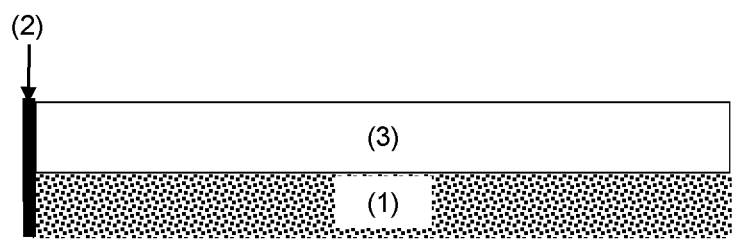
FIG. 11 shows an oxidation catalyst having a catalytic region (3) disposed on a substrate (1). There is a capture face (2) disposed or supported at an inlet end surface of the substrate (1).

In a third oxidation catalyst arrangement, the substrate comprises an inlet end surface and an outlet end surface. The capture region is disposed or supported (e.g. directly disposed or supported) on either an inlet end surface or an outlet end surface (i.e. of the substrate), preferably an inlet end surface. See FIGS. 9 and 10.

In the third oxidation catalyst arrangement, the capture region may be referred to as a "capture face" because it is located on a face of the substrate The capture face may consist essentially of the capture material (e.g. any one of the first to seventh capture material embodiments described above) or a plurality of capture materials (e.g. any two of the first to seventh capture material embodiments described above), such as a mixture of two or more capture materials. It is preferred that the capture face preferably consists essentially of the capture material (i.e. a single capture material).

The capture face is preferably disposed or supported (e.g. directly disposed or supported) on an inlet end surface of the substrate (i.e. the upstream, end face of the substrate). The inlet end surface of a substrate typically comprises a plurality of channel wall edges.

The inlet end surface of the substrate may be planar (e.g. as in conventional honeycomb substrates) or non-planar. When the inlet end surface of the substrate is non-planar, then the inlet end surface may have a three-dimensional topographical configuration. Examples of substrates having a non-planar end surface are described in U.S. Pat. No. 8,257,659. Substrates having non-planar end surfaces may provide a larger surface area for the capture material to capture or trap at least one phosphorus containing impurity from the exhaust gas.

In general, it is preferred that the inlet end surface and/or the outlet end surface of the substrate is planar.

Figure 12:
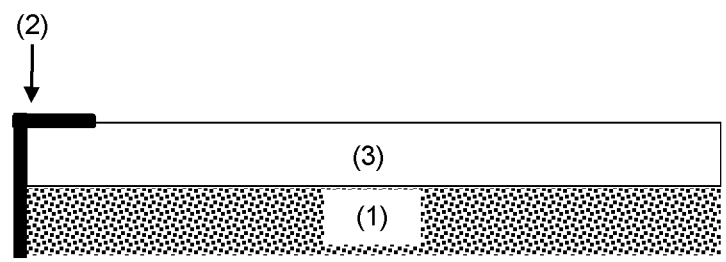
FIG. 12 shows an oxidation catalyst having a catalytic region (3) disposed on a substrate (1). There is a capture face and zone (2) disposed or supported at an inlet end surface of the substrate, which partially overlies the catalytic region (3).

In addition to being disposed or supported on an inlet end surface of the substrate, the capture region may be disposed or supported within the substrate, such as on a plurality of channel walls or the catalytic region within the substrate. During application of the capture face, some of the capture material may enter the channels of the substrate thereby partially coating the channel walls within the substrate. See FIG. 12.

When the capture region is disposed or supported on a plurality of channel walls within the substrate, then the oxidation catalyst further comprises a capture zone. The capture zone has the same composition as the capture face (e.g. the capture zone comprises, or consists essentially of, the capture material).

In the third oxidation catalyst arrangement, the capture face typically has a mean length (e.g. from the inlet end surface of the substrate) of <25 mm, preferably ≤20 mm, such as ≤15 mm, more preferably ≤10 mm (e.g. ≤5 mm), and even more preferably ≤3 mm (e.g. <3 mm). For the avoidance of doubt, the mean length refers to a length in the axial direction of the substrate.

In the third oxidation catalyst arrangement, the catalytic region is generally disposed or supported (e.g. directly disposed or supported) within the substrate, such as on a plurality of channel walls within the substrate.

The catalytic region may be either (i) a catalytic layer, (ii) a first catalytic layer and a second catalytic layer, or (iii) a first catalytic zone and a second catalytic zone.

When the catalytic region is (i) a catalytic layer, the catalytic layer may be disposed or supported (e.g. directly disposed or supported) on the substrate. The catalytic layer is preferably a single catalytic layer.

The catalytic layer preferably extends for substantially an entire length of the substrate, particularly the entire length of the channels of a monolith substrate.

In (ii), the catalytic region is a first catalytic layer and a second catalytic layer. It is preferred that the first catalytic layer is disposed or supported (e.g. directly disposed or supported) on the second catalytic layer, and the second catalytic layer is disposed or supported (e.g. directly disposed or supported) on the substrate.

Each of the first catalytic layer and the second catalytic layer preferably extends for substantially an entire length of the substrate, particularly the entire length of the channels of a monolith substrate.

When the oxidation catalyst comprises a second catalytic layer, then it is preferred that the first catalytic layer comprise a support material, which is sulfur tolerant, such as described below.

In (iii), the catalytic region is a first catalytic zone and a second catalytic zone. The first catalytic zone and the second catalytic zone are preferably disposed or supported on the substrate, more preferably directly disposed or supported on the substrate.

The first catalytic zone typically has a length of 2.5 to 90% (e.g. 2.5 to 50% or 50 to 90%) of the length of the substrate, preferably 5 to 80% (e.g. 5 to 45% or 45 to 80%), particularly 10 to 75% (e.g. 10 to 40% or 40 to 75%) of the length of the substrate, more preferably 15 to 65% (e.g. 15 to 30% or 30 to 65%) of the length of the substrate.

Typically, the second catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

It is generally preferred that the first catalytic zone is disposed or supported upstream of the second catalytic zone. More preferably, the first catalytic zone is disposed or supported at or near an inlet end of the substrate.

The first catalytic zone may adjoin the second catalytic zone. Preferably, the first catalytic zone is in contact with the second catalytic zone. When the first catalytic zone adjoins the second catalytic zone or the first catalytic zone is in contact with the second catalytic zone, then the first catalytic zone and the second catalytic zone may be disposed or supported on the substrate as a layer (e.g. a single layer). Thus, a layer (e.g. a single) may be formed on the substrate when the first and second catalytic zones adjoin or are in contact with one another.

The first catalytic zone may be separate from the second catalytic zone. There may be a gap (e.g. a space) between the first catalytic zone and the second catalytic zone.

Alternatively, the first catalytic zone may overlap the second catalytic zone. An end portion or part of the first catalytic zone may be disposed or supported on the second catalytic zone. The first catalytic zone generally only partly overlaps the second catalytic zone.

In general, it may be preferable that the first catalytic zone comprises a support material, which is sulfur tolerant, such as described below.

Fourth Arrangement

In a fourth oxidation catalyst arrangement, the catalytic region further comprises the capture material. Thus, the catalytic region comprises, or consists essentially of, the capture material and the catalytic material.

The catalytic region may comprise, or consist essentially of, a mixture of the capture material and the catalytic material. More preferably, the catalytic region comprises, or consists essentially of, a mixture of particles of the capture material and particles of the catalytic material.

In the fourth oxidation catalyst, the catalytic region may be disposed or supported (e.g. directly disposed or supported) on the substrate.

The catalytic region may be a catalytic layer, preferably a single catalytic layer.

The catalytic layer preferably extends for substantially an entire length of the substrate, particularly the entire length of the channels of a monolith substrate.

The oxidation catalyst may further comprise a second catalytic region, such as a second catalytic region as defined herein below. When the oxidation catalyst comprises a second catalytic region, then the catalytic region that comprises the capture material is referred to herein below as the "first catalytic region".

The oxidation catalyst may comprise a first catalytic region and a second catalytic region, where either (i) the first catalytic region is a first catalytic layer and the second catalytic region is a second catalytic layer, (ii) the first catalytic region is a first catalytic zone and the second catalytic region is a second catalytic zone, or (iii) the first catalytic region is a first catalytic zone and the second catalytic region is a second catalytic layer.

In (i), the first catalytic layer is preferably disposed or supported (e.g. directly disposed or supported) on the second catalytic layer. More preferably, the second catalytic layer is disposed or supported (e.g. directly disposed or supported) on the substrate.

Each of the first catalytic layer and the second catalytic layer preferably extends for substantially an entire length of the substrate, particularly the entire length of the channels of a monolith substrate.

When the oxidation catalyst of the fourth arrangement comprises a first catalytic layer and a second catalytic layer (as in (i)), then it is preferred that the first catalytic layer, preferably the catalytic material of the first catalytic layer, comprises a support material, which is sulfur tolerant, such as described below.

In (ii), the first catalytic region is a first catalytic zone and the second catalytic region is a second catalytic zone. The first catalytic zone and the second catalytic zone are preferably disposed or supported on the substrate, more preferably directly disposed or supported on the substrate.

The first catalytic zone typically has a length of 2.5 to 90% (e.g. 2.5 to 50% or 50 to 90%) of the length of the substrate, preferably 5 to 80% (e.g. 5 to 45% or 45 to 80%), particularly 10 to 75% (e.g. 10 to 40% or 40 to 75%) of the length of the substrate, more preferably 15 to 65% (e.g. 15 to 30% or 30 to 65%) of the length of the substrate.

Typically, the second catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

It is generally preferred that the first catalytic zone is disposed or supported upstream of the second catalytic zone. More preferably, the first catalytic zone is disposed or supported at or near an inlet end of the substrate.

The first catalytic zone may adjoin the second catalytic zone. Preferably, the first catalytic zone is in contact with the second catalytic zone. When the first catalytic zone adjoins the second catalytic zone or the first catalytic zone is in contact with the second catalytic zone, then the first catalytic zone and the second catalytic zone may be disposed or supported on the substrate as a layer (e.g. a single layer). Thus, a layer (e.g. a single) may be formed on the substrate when the first and second catalytic zones adjoin or are in contact with one another.

The first catalytic zone may be separate from the second catalytic zone. There may be a gap (e.g. a space) between the first catalytic zone and the second catalytic zone.

Alternatively, the first catalytic zone may overlap the second catalytic zone. An end portion or part of the first catalytic zone may be disposed or supported on the second catalytic zone. The first catalytic zone generally only partly overlaps the second catalytic zone.

In (iii), the first catalytic region is a first catalytic zone and the second catalytic region is a second catalytic layer.

The first catalytic zone typically has a length of 2.5 to 90% (e.g. 2.5 to 50% or 50 to 90%) of the length of the substrate, preferably 5 to 80% (e.g. 5 to 45% or 45 to 80%), particularly 10 to 75% (e.g. 10 to 40% or 40 to 75%) of the length of the substrate, more preferably 15 to 65% (e.g. 15 to 30% or 30 to 65%) of the length of the substrate.

The second catalytic layer preferably extends for substantially an entire length of the substrate, particularly the entire length of the channels of a monolith substrate.

The first catalytic zone is preferably disposed or supported on the second catalytic layer at or near an inlet end of the substrate. More preferably, the first catalytic zone is directly disposed or supported on the second catalytic layer at or near an inlet end of the substrate.

The second catalytic layer is preferably disposed or supported (e.g. directly disposed or supported) on the substrate.

When the first catalytic zone is disposed or supported on the second catalytic layer, it is preferred that the entire length of the first catalytic zone is disposed or supported on the second catalytic layer. The length of the first catalytic zone is less than the length of the second catalytic layer.

In both (ii) and (iii), it may be preferable that the first catalytic zone comprises a support material, which is sulfur tolerant, such as described below.

Catalytic Region or First Catalytic Region

The composition of the catalytic region is described below. When the catalytic region is a first catalytic region (e.g. a first catalytic layer or a first catalytic zone) and a second catalytic region (e.g. a second catalytic layer or a second catalytic zone), then any reference to the composition of the "catalytic region" refers to the composition of the "first catalytic region". Thus, any reference below to the "catalytic region" is equally applicable to the "first catalytic region".

The catalytic region comprises a catalytic material comprising a platinum group metal (PGM) selected from the group consisting of platinum (Pt), palladium (Pd) and a combination of platinum (Pt) and palladium (Pd). The PGM may be Pt. The PGM may be Pd. The PGM may be a combination of Pt and Pd.

Typically, the catalytic material further comprises a support material. The platinum group metal (PGM) is preferably disposed or supported on the support material. More preferably, the platinum group metal (PGM) is disposed directly onto or is directly supported on the support material (e.g. there is no intervening material between the PGM and the support material). For example, the PGM can be dispersed over a surface of and/or impregnated within the support material.

In general, the support material comprises, or consists essentially of, a refractory oxide. The refractory oxide may be selected from the group consisting of alumina, silica, titania, zirconia, ceria and a mixed or composite oxide of at least one refractory oxide thereof.

The refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia, ceria-zirconia-alumina and alumina-magnesium oxide.

In general, it is preferable that the refractory oxide comprises or consists essentially of alumina, silica or silica-alumina, especially alumina.

When the support material or the refractory oxide thereof, comprises or consists essentially of a mixed or composite oxide of alumina (e.g. silica-alumina, alumina-magnesium oxide or a mixture of alumina and ceria), then preferably the mixed or composite oxide of alumina comprises at least 50 to 99% by weight of alumina, more preferably 70 to 95% by weight of alumina, even more preferably 75 to 90% by weight of alumina.

When the support material or the refractory oxide thereof, comprises or consists essentially of ceria-zirconia, then the ceria-zirconia may consist essentially of 20 to 95 by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

The support material or the refractory oxide thereof may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

When the support material or the refractory oxide thereof is doped, the total amount of dopant is 0.25 to 5% by weight, preferably 0.5 to 3% by weight (e.g. about 1% by weight).

The support material or the refractory oxide thereof may comprise or consist essentially of alumina doped with a dopant. The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprise, or consist essentially of, an oxide of silicon (e.g. silica), an oxide of magnesium (e.g. magnesium oxide), an oxide of lanthanum (e.g. lanthana), an oxide of cerium (e.g. ceria), an oxide of titanium (e.g. titania) or an oxide of zirconium (e.g. zirconia). Preferably, the dopant comprises, or consists essentially of, silicon, magnesium, cerium, or an oxide thereof, particularly silicon, or cerium, or an oxide thereof. More preferably, the dopant comprises, or consists essentially of, silicon, magnesium or an oxide thereof; particularly silicon, magnesium, or an oxide thereof; especially silicon or an oxide thereof.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20 by weight), even more preferably 4.5 to 15% by weight.

When the alumina is alumina doped with magnesium oxide, then the alumina is doped with magnesium oxide in an amount as defined above or an amount of 1 to 40% by weight (i.e. % by weight of the alumina), such as 5 to 28% by weight. More preferably, the alumina is doped with magnesium oxide in amount of 10 to 25% by weight.

It may be preferable that the support material or the refractory oxide thereof is titania ($TiO_2$). It has been found that these support materials are sulfur tolerant and may advantageously be used when the engine is run on a fuel, such as a diesel or biodiesel, containing a high content of sulfur.

The catalytic material may comprise a single platinum group metal (PGM) (i.e. this is the only platinum group metal). The single platinum group metal may be platinum. The single platinum group metal may be palladium.

When the PGM is a combination of platinum and palladium, then typically the catalytic region or the catalytic material thereof comprises a ratio by weight of Pt to Pd of 20:1 to 1:20 (e.g. 15:1 to 1:15), preferably 10:1 to 1:10 (e.g. 7.5:1 to 1:7.5), more preferably 5:1 to 1:5 (e.g. 3:1 to 1:3), and even more preferably 2.5:1 to 1:1.

In general, it is preferable that the catalytic region or the catalytic material thereof comprises Pt and Pd, then typically the ratio by mass of Pt to Pd is 1:1. The catalytic material may comprise Pt and optionally Pd, such that the ratio by mass of Pt to Pd is from 1:0 to 1:1. The ratio by mass (i.e. mass ratio) of Pt to Pd is preferably 50:1 to 1:1, more preferably 30:1 to 2:1 (e.g. 25:1 to 4:1), even more preferably 20:1 to 5:1, such as 15:1 to 7.5:1.

It is preferred that when the catalytic region or the catalytic material thereof comprises Pt and Pd, then the ratio by mass of Pt to Pd is 1.5:1, more preferably 2:1 (e.g. 3:1), even more preferably 4:1, such as 10:1.

Typically, the oxidation catalyst has a total loading of PGM of 5 to 500 g ft$^{-3}$. Preferably, the total loading of PGM is 10 to 400 g ft$^{-3}$, more preferably 20 to 350 g ft$^{-3}$, still more preferably 40 to 300 g ft$^{-3}$, and even more preferably 50 to 250 g ft$^{-3}$.

In general, it is preferred that the catalytic region or the oxidation catalyst (e.g. the emissions control device as a whole) is substantially free of rhodium. More preferably, the catalytic region or the oxidation catalyst does not comprise rhodium. Rhodium is often included in three-way conversion catalysts or lean $NO_x$ traps. The oxidation catalyst of the invention is a diesel oxidation catalyst and is used primarily for the oxidation of carbon monoxide and unburned hydrocarbons.

Additionally or alternatively, the catalytic region or the oxidation catalyst is substantially free of an alkaline earth metal. More preferably, the catalytic region or the oxidation catalyst does not comprise an alkaline earth metal. When the capture material comprises an alkaline earth metal, then the oxidation catalyst does not comprise an alkaline earth metal except for the alkaline earth metal of the capture material. Alkaline earth metals are sometimes included in three-way conversion catalysts or lean $NO_x$ traps.

Generally, it is preferred that the catalytic region or the oxidation catalyst is substantially free of a zeolite for absorbing hydrocarbons. More preferably, the catalytic region or the oxidation catalyst does not comprise a zeolite for absorbing hydrocarbons. For heavy duty diesel applications, the inclusion of a zeolite for absorbing hydrocarbons is unnecessary. In fact, the high temperatures that are typically encountered by an oxidation catalyst in an exhaust system of a heavy duty diesel vehicle may significantly degrade or destroy such a zeolite.

Second Catalytic Region

The second catalytic region typically comprises, or consists essentially of, a platinum group metal (PGM) and a support material.

The platinum group metal (PGM) of the second catalytic region may be referred to herein as the "second platinum group metal (PGM)" to distinguish it from the platinum group metal (PGM) of the "catalytic region" or the "first catalytic region" described above. The term "second" in the expression "second platinum group metal (PGM)" is a label and does not restrict the number of platinum group metals that must be present.

Similarly, the support material of the second catalytic region may be referred to herein as the "second support material" to distinguish it from the support material of the "catalytic region" or the "first catalytic region" described above. The term "second" in the expression "second support material" is a label and does not restrict the number of support materials that must be present.

The second platinum group metal (PGM) is preferably disposed or supported on the second support material. More preferably, the second PGM is disposed directly onto or is directly supported on the second support material (e.g. there is no intervening material between the second PGM and the second support material). For example, the second PGM can be dispersed over a surface of and/or impregnated within the second support material.

The second catalytic region typically has a different composition to the first catalytic region.

It is preferable that the second catalytic region is substantially free of the capture material. More preferably, the second catalytic region does not comprise the capture material.

In general, the second catalytic region has a uniform composition (e.g. homogenous composition).

The second PGM may be selected from the group consisting of platinum (Pt), palladium (Pd) and a combination of platinum (Pt) and palladium (Pd). The second PGM may be Pt. The second PGM may be Pd. The second PGM may be a combination of Pt and Pd.

The second catalytic region may comprise a single platinum group metal (PGM) (i.e. the second PGM is the only platinum group metal). The single platinum group metal may be platinum. The single platinum group metal may be palladium.

When the second PGM is a combination of platinum and palladium, then typically the second catalytic region comprises a ratio by weight of Pt to Pd of 20:1 to 1:20 (e.g. 15:1 to 1:15), preferably 10:1 to 1:10 (e.g. 7.5:1 to 1:7.5), more preferably 5:1 to 1:5 (e.g. 3:1 to 1:3), and even more preferably 2.5:1 to 1:1.

It may be preferable that the second catalytic region comprises Pt and Pd in a ratio by mass of Pt to Pd of 4:1. The second catalytic region may comprise Pd and optionally Pt, such that the ratio by mass of Pd to Pt is 20:1 to 1:4. The ratio by mass (i.e. mass ratio) of Pd to Pt is preferably 15:1 to 1:2, more preferably 10:1 to 1:1.5, even more preferably 5:1 to 1:1.

Typically, the second catalytic region has a total loading of second PGM of 5 to 250 g ft$^{-3}$. Preferably, the total loading of PGM is 10 to 200 g ft$^{-3}$, more preferably 15 to 175 g ft$^{-3}$, still more preferably 20 to 150 g ft$^{-3}$, and even more preferably 25 to 125 g ft$^{-3}$.

The second support material comprises, or consists essentially of, a refractory oxide. The refractory oxide may be selected from the group consisting of alumina, silica, titania, zirconia, ceria and a mixed or composite oxide of at least one refractory oxide thereof. The refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

It is preferred that the second support material or the refractory oxide thereof comprises, or consists essentially of, alumina, silica or silica-alumina.

When the second support material or the refractory oxide thereof, comprises or consists essentially of a mixed or composite oxide of alumina (e.g. silica-alumina, alumina-magnesium oxide or a mixture of alumina and ceria), then preferably the mixed or composite oxide of alumina comprises at least 50 to 99% by weight of alumina, more preferably 70 to 95% by weight of alumina, even more preferably 75 to 90% by weight of alumina.

When the second support material or the refractory oxide thereof, comprises or consists essentially of ceria-zirconia, then the ceria-zirconia may consist essentially of 20 to 95 by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

The second support material or the refractory oxide thereof may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

When the second support material or the refractory oxide thereof is doped, the total amount of dopant is 0.25 to 5% by weight, preferably 0.5 to 3% by weight (e.g. about 1% by weight).

The support material or the refractory oxide thereof may comprise or consist essentially of alumina doped with a dopant. The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprise, or consist essentially of, an oxide of silicon (e.g. silica), an oxide of magnesium (e.g. magnesium oxide), an oxide of lanthanum (e.g. lanthana), an oxide of cerium (e.g. ceria), an oxide of titanium (e.g. titania) or an oxide of zirconium (e.g. zirconia). Preferably, the dopant comprises, or consists essentially of, silicon, magnesium, cerium, or an oxide thereof, particularly silicon, or cerium, or an oxide thereof. More preferably, the dopant comprises, or consists essentially of, silicon, magnesium or an oxide thereof; particularly silicon, magnesium, or an oxide thereof; especially silicon or an oxide thereof.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20 by weight), even more preferably 4.5 to 15% by weight.

When the alumina is alumina doped with magnesium oxide, then the alumina is doped with magnesium oxide in an amount as defined above or an amount of 1 to 40% by weight (i.e. % by weight of the alumina), such as 5 to 28% by weight. More preferably, the alumina is doped with magnesium oxide in amount of 10 to 25% by weight.

The second catalytic region may further comprise a hydrocarbon adsorbent. The hydrocarbon adsorbent is preferably a zeolite.

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the hydrocarbon adsorbent is a zeolite, then preferably the zeolite is a medium pore zeolite or a large pore zeolite.

When the second catalytic region comprises a hydrocarbon adsorbent, the second catalytic region has a total amount of hydrocarbon adsorbent of 0.05 to 3.00 g in$^{-3}$, particularly 0.10 to 2.00 g in$^{-3}$, more particularly 0.2 to 0.8 g in$^{-3}$. For example, the total amount of hydrocarbon adsorbent may be 0.8 to 1.75 g in$^{-3}$, such as 1.0 to 1.5 g in$^{-3}$.

In general, it is preferred that the second catalytic region is substantially free of rhodium. More preferably, the second catalytic region does not comprise rhodium.

Additionally or alternatively, the second catalytic region is substantially free of an alkaline earth metal. More preferably, the second catalytic region does not comprise an alkaline earth metal.

It may be preferable that the second catalytic region is substantially free of a hydrocarbon adsorbent, particularly a zeolite (e.g. for absorbing hydrocarbons). More preferably, the second catalytic region does not comprise a hydrocarbon adsorbent, particularly a zeolite (e.g. for absorbing hydrocarbons).

Substrate

In general (including any one of the oxidation catalyst arrangements mentioned above), the oxidation catalyst may be a diesel oxidation catalyst (DOC), a catalysed soot filter (CSF), a diesel exotherm catalyst (DEC), a NO$_x$ storage catalyst (NSC) or a passive NOx adsorber (PNA). It is preferred that the oxidation catalyst is a DOC, DEC or a CSF. More preferably, the oxidation catalyst is a DOC or a DEC, even more preferably the oxidation catalyst is a DOC.

Substrates for supporting oxidation catalysts are well known in the art. Methods for making washcoats to apply the catalytic material or capture material onto a substrate and methods for applying washcoats onto a substrate are also known in the art (see, for example, WO 99/47260, WO 2007/077462 and WO 2011/080525).

The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

Typically, the substrate is a monolith (also referred to herein as a monolith substrate). Such monolith substrates are well-known in the art. The monolith substrate may be a flow-through monolith substrate or a filtering monolith substrate.

A flow-through monolith substrate typically comprises a honeycomb monolith (e.g. a metal or ceramic honeycomb monolith) having a plurality of channels extending therethrough, which channels are open at both ends. When the substrate is a flow-through monolith substrate, then the oxidation catalyst of the invention is typically a diesel oxidation catalyst (DOC), a diesel exotherm catalyst (DEC), a $NO_x$ storage catalyst (NSC) or a passive $NO_x$ adsorber (PNA).

A filtering monolith substrate generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith substrate, then the oxidation catalyst of the invention is typically a catalysed soot filter (CSF), a $NO_x$ storage catalyst (NSC) on a filter or a passive $NO_x$ adsorber (PNA) on filter, preferably a catalysed soot filter (CSF).

When the monolith substrate is a filtering monolith substrate, it is preferred that the filtering monolith substrate is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

When the oxidation catalyst of the invention is a catalysed soot filter (CSF), then both the catalytic region (or catalytic layer or catalytic zone) and the capture region (or capture layer or capture zone) may be disposed or supported on (i) a plurality of inlet channel walls of the substrate, and/or (ii) a plurality of outlet channel walls of the substrate.

Alternatively, it preferred that when the oxidation catalyst of the invention is a catalysed soot filter (CSF), then the catalytic region (or catalytic layer or catalytic zone) is disposed or supported on a plurality of outlet channel walls of the substrate, and the capture region (or capture layer or capture zone) is disposed or supported on a plurality of inlet channel walls of the substrate.

The substrate, particularly the monolith substrate, preferably has a diameter of ≥7 inches (e.g. ≥17.8 cm). Such monolith substrates tend to be used in heavy duty diesel applications.

The catalyst volume (e.g. from all of the coatings (i.e. the capture region, catalytic region) applied to the monolith substrate) is typically ≥2.0 L, more preferably ≥2.5 L.

Exhaust System

The invention further relates to an exhaust system for treating an exhaust gas produced by a diesel engine. The exhaust system comprises the oxidation catalyst of the invention and an emissions control device. The emissions control device is preferably downstream of the oxidation catalyst.

Examples of an emissions control device include a diesel particulate filter (DPF), a $NO_x$ storage catalyst (NSC), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

It is preferred that the exhaust system comprises an emissions control device selected from the group consisting of a $NO_x$ storage catalyst (NSC), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas upstream of the SCR catalyst or the SCRF™ catalyst. Typically, the injector is downstream of the oxidation catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector, ammonia can be generated in situ (e.g. during rich regeneration of a NSC disposed upstream of the SCR catalyst or the SCRF™ catalyst). Thus, the exhaust system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the exhaust system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

The oxidation catalyst of the invention is preferably directly coupled to (e.g. directly downstream of) an exhaust manifold of the diesel engine. When the oxidation catalyst is directly coupled to the exhaust manifold, there is no emissions control device between the oxidation catalyst of the invention and the exhaust manifold. Thus, the oxidation catalyst of the invention is the first emissions control device encountered by the exhaust gas produced by the diesel engine.

The oxidation catalyst may be close-coupled to an exhaust manifold of the diesel engine.

In a first exhaust system arrangement, the exhaust system comprises the oxidation catalyst of the invention and a selective catalytic reduction filter (SCRF™) catalyst. The oxidation catalyst of the invention is typically followed by (e.g. is upstream of) the selective catalytic reduction filter (SCRF™) catalyst.

A nitrogenous reductant injector may be arranged between the oxidation catalyst and the selective catalytic reduction filter (SCRF™) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF™) catalyst.

In a second exhaust system arrangement, the exhaust system comprises the oxidation catalyst of the invention and a selective catalytic reduction (SCR) catalyst, and optionally either a catalysed soot filter (CSF) or a diesel particulate filter (DPF). The oxidation catalyst is typically followed by (e.g. is upstream of) the selective catalytic reduction (SCR) catalyst.

A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst may be followed by (e.g. are upstream of) the catalysed soot filter (CSF) or the diesel particulate filter (DPF).

In a third exhaust system arrangement, the exhaust system comprises the oxidation catalyst of the invention and a catalysed soot filter (CSF). The oxidation catalyst is typically followed by (e.g. is upstream of) the catalysed soot filter (CSF). Thus, for example, an outlet of the oxidation catalyst is connected to an inlet of the catalysed soot filter.

In a fourth exhaust system arrangement, the exhaust system comprises the oxidation catalyst of the invention, a catalysed soot filter (CSF) and a selective catalytic reduction (SCR) catalyst. The oxidation catalyst is typically followed by (e.g. is upstream of) the catalysed soot filter (CSF). The catalysed soot filter is typically followed by (e.g. is upstream of) the selective catalytic reduction (SCR) catalyst.

A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In any of the embodiments of the first, second or fourth exhaust system arrangements described hereinabove, an ASC catalyst can be disposed downstream from the SCR catalyst or the SCRF™ catalyst (i.e. as a separate substrate monolith), or more preferably as a zone on a downstream or trailing end of the substrate monolith comprising the SCR catalyst can be used as a support for the ASC.

Vehicle

The invention further provides a vehicle. The vehicle comprises a diesel engine and either an oxidation catalyst or an exhaust system of the invention.

The diesel engine is typically a conventional (i.e. traditional) diesel engine.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

It is preferred that the vehicle is a heavy-duty diesel vehicle (HDV), such as a diesel vehicle having a gross weight of >8,500 pounds (US lbs), as defined in US legislation.

Uses and Methods

The exhaust gas may be produced by a diesel engine run on diesel fuel (e.g. conventional diesel fuel) or a biodiesel fuel.

The biodiesel fuel may be B100 (e.g. 100% biodiesel) or it may be a blend of biodiesel and petrodiesel, such as B6 to B20 (e.g. 6 to 20% biodiesel and 80 to 94% petrodiesel, such as set out in ASTM D7467).

Biodiesel often contains several impurities, which each contain an element from the p-block of the periodic table, particularly from the third row (period 3) of the periodic table (e.g. phosphorus and/or sulfur).

When the diesel engine is run on biodiesel, it may be preferable that, in the oxidation catalyst of the invention, the support material of the catalytic region/first catalytic region is sulfur tolerant.

The diesel engine may be run on a diesel fuel comprising ≤50 ppm of sulfur, more preferably ≤15 ppm of sulfur, such as ≤10 ppm of sulfur, and even more preferably ≤5 ppm of sulfur. Such diesel fuels are often referred to as "ultra-low-sulfur diesel" (ULSD).

Alternatively, the diesel engine may be run on a fuel, such as a diesel fuel, comprising >50 ppm of sulfur, such as 400 to 2000 ppm of sulfur. When the diesel engine is run on such a diesel fuel, it may be preferable that, in the oxidation catalyst of the invention, the support material of the catalytic region/first catalytic region is sulfur tolerant.

Definitions

The term "mixed oxide" as used herein generally refers to a mixture of oxides in a single phase, as is conventionally known in the art. The term "composite oxide" as used herein generally refers to a composition of oxides having more than one phase, as is conventionally known in the art.

For the avoidance of doubt, the term "combination of platinum (Pt) and palladium (Pd)" as used herein in relation to a region, zone or layer refers to the presence of both platinum and palladium in the region, the zone or the layer. The word "combination" does not require that the platinum and palladium are present as a mixture or an alloy, although such a mixture or alloy is embraced by this term.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt, unless otherwise specified.

The expression "on the substrate" as used herein, in the context of a region, layer or zone being "disposed or supported on the substrate", generally refers to the region, layer or zone being located on a surface of a channel wall within the substrate, unless specified otherwise.

The expression "end surface" as used herein, particularly with reference to an "inlet end surface" or an "outlet end surface", is synonymous with the expression "end face". The end surface or end face of a substrate is typically formed by the wall edges (e.g. at an exterior surface of the substrate) that define or bound the channels through the substrate.

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in composition when comparing one part of the region with another part of that region), unless the context requires otherwise. More preferably, each zone or layer has a substantially uniform composition (e.g. a homogenous composition). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as 75% of the total length of the substrate. A "zone" typically has a length (i.e. a substantially uniform length) of at least 5% (e.g. 5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:
(a) nearer to an inlet end (e.g. open end) of an inlet channel of the substrate than the zone is to a closed end (e.g. blocked or plugged end) of the inlet channel, and/or
(b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:
(a) nearer to an outlet end (e.g. an open end) of an outlet channel of the substrate than the zone is to a closed end (e.g. blocked or plugged) of the outlet channel, and/or
(b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a washcoat region, a washcoat layer or a washcoat zone, means that the material in a minor amount, such as ≤5% by weight, preferably ≤2% by weight, more preferably ≤1% by weight. The expression "substantially free of" embraces the expression "does not comprise".

The expression "about" as used herein with reference to an end point of a numerical range includes the exact end point of the specified numerical range. Thus, for example, an expression defining a parameter as being up to "about 0.2" includes the parameter being up to and including 0.2.

The term "selective catalytic reduction filter catalyst" as used herein includes a selective catalytic reduction formulation that has been coated onto a diesel particulate filter (SCR-DPF), which is known in the art.

For the avoidance of doubt, the term "sulfur tolerant" as used herein refers to a material, such as a support material or a refractory oxide thereof, that does not react with or adsorb a sulfur containing impurity, particularly an oxide of sulfur, during use.

EXAMPLES

The invention will now be illustrated by the following non-limiting examples.

Comparative Example

Bottom Catalytic Layer

Alumina powder (2.0 g in$^{-3}$) was slurried in water and milled to a d90 of <20 micron. Soluble platinum and palladium salts were added to the slurry. The slurry was then stirred to homogenise. The resulting washcoat was then applied to a honeycomb monolith substrate (ceramic; 11.25"×4"; 300 cpsi) using conventional methods. A single layer was formed by dosing the washcoat to a 50% length from each of the inlet and outlet ends of the substrate. The coated substrate was dried and then calcined at 500° C. The loading of Pt was 5 g ft$^{-3}$ and the loading of Pd was 2.5 g ft$^{-3}$.

Upper Catalytic Layer

Alumina powder (0.95 g in$^{-3}$) was slurried in water and milled to a d90 of <20 micron. A soluble platinum salt was added to the slurry in an amount to provide a Pt loading of 2.5 g ft$^{-3}$. The slurry was then stirred to homogenise. Using conventional methods, the resulting washcoat was then applied onto a honeycomb monolith substrate coated with a bottom catalytic layer, as described above. The coated substrate was dried and then calcined at 500° C.

The catalyst had an overall loading of 10 g ft$^{-3}$ of platinum group metal in an overall platinum to palladium ratio by weight of 3:1.

Example 1

Bottom Catalytic Layer

A honeycomb monolith substrate having a bottom catalytic layer was prepared in the same way as the Comparative Example.

Capture Layer

Alumina powder (0.95 g in$^{-3}$) was slurried in water and milled to a d90 of <20 micron. A soluble platinum salt was added to the slurry in an amount to provide a Pt loading of 2.5 g ft$^{-3}$. A copper exchanged zeolite (having the CHA framework) was stirred into the slurry in an amount to provide a loading of 0.2 g in$^{-3}$. Using conventional methods, the resulting washcoat was then applied onto a honeycomb monolith substrate coated with a bottom catalytic layer, as described above. The coated substrate was dried and then calcined at 500° C.

Figure 2:
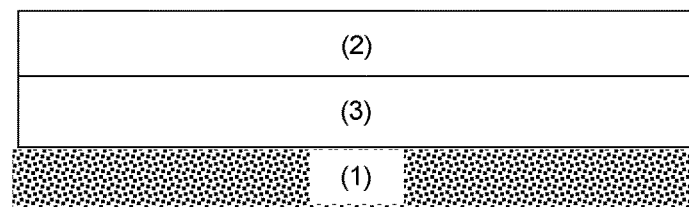
FIGS. 2 to 9 are schematic drawings of oxidation catalysts of the invention.

The oxidation catalyst of Example 1 had a structure as shown in FIG. 2. The catalyst had an overall loading of 10 g ft$^{-3}$ of platinum group metal in an overall platinum to palladium ratio by weight of 3:1.

Example 2

Bottom Catalytic Layer

A honeycomb monolith substrate having a bottom catalytic layer was prepared in the same way as the Comparative Example.

Front Capture Zone

A washcoat comprising alumina powder (0.95 g in$^{-3}$), Pt (about 2.5 g ft$^{-3}$) and a copper exchanged CHA zeolite (0.2 g in$^{-3}$) was prepared in the same way as the capture layer of Example 1. The resulting washcoat was then applied to a honeycomb monolith substrate coated with a bottom catalytic layer (as described above) using conventional methods. A front zone was formed by dosing the washcoat to a 50% length from the inlet end of the substrate.

Rear Catalytic Zone

A washcoat comprising alumina powder (0.95 g in$^{-3}$) and Pt (2.5 g ft$^{-3}$) was prepared in the same way as the upper catalytic layer of the Comparative Example. The resulting washcoat was then applied to a honeycomb monolith substrate coated with a bottom catalytic layer (as described above) using conventional methods. A rear zone was formed by dosing the washcoat to a 50% length from the outlet end of the substrate.

Once both the washcoats for the front capture zone and the rear catalytic zone had been applied to the substrate, the coated substrate was dried and then calcined at 500° C. The resulting oxidation catalyst had a structure as shown in FIG. 8.

The catalyst had an overall loading of 10 g ft$^{-3}$ of platinum group metal in an overall platinum to palladium ratio by weight of 3:1.

Example 3

Bottom Catalytic Layer

A honeycomb monolith substrate having a bottom catalytic layer was prepared in the same way as the Comparative Example.

Upper Catalytic Layer

The upper catalytic layer was prepared in the same way as the Comparative Example.

Capture Zone

A slurry of a copper exchanged CHA zeolite (0.615 g in$^{-3}$) in water was prepared. The resulting washcoat was then applied at the inlet end of the catalyst to form a front zone by dosing the slurry to a 25% length from the inlet end of the substrate. The coated substrate was dried and then calcined at 500° C.

Experimental Results

A batch of each of the catalysts of Examples 1 to 3 and the Comparative Example was coupled to engine, which was run repeatedly under an ageing test for 1 hour until 750 liters of phosphorus doped B100 (biodiesel) fuel had been consumed.

A sample core was taken from each catalyst of Examples 1 to 3 and the Comparative Example. Each core was ground up and then formed into a pellet for analysis by X-ray fluorescence (XRF). The results from the XRF analysis are shown in Table 1 below.

TABLE 1

|  | Level of: | |
| --- | --- | --- |
|  | Phosphorus (wt %) | Sulfur (wt %) |
| Comparative Example | 0.62 | 0.22 |
| Example 1 | 0.65 | 0.22 |
| Example 2 | 0.56 | 0.18 |
| Example 3 | 0.54 | 0.17 |

The XRF results in Table 1 show that all four catalyst contained similar levels of phosphorus and sulfur containing impurities.

For the avoidance of any doubt, the entire content of any and all documents cited herein is incorporated by reference herein.

The invention claimed is:

1. An oxidation catalyst for treating an exhaust gas produced by a diesel engine, wherein the oxidation catalyst comprises:
a substrate;
a capture region comprising a capture material for capturing at least one phosphorus containing impurity or at least one sulfur containing impurity in the exhaust gas produced by the diesel engine, wherein the capture material comprises a molecular sieve having a silica to alumina molar ratio of 10 to 200, and wherein the molecular sieve comprises a base metal selected from the group consisting of iron (Fe), copper (Cu), nickel (Ni) and a combination of two or more thereof; and
a catalytic region disposed on the substrate;
wherein the catalytic region comprises a catalytic material comprising a platinum group metal (PGM) supported on a support material comprising a refractory oxide, wherein the platinum group metal (PGM) is selected from the group consisting of platinum (Pt), palladium (Pd) and a combination of platinum (Pt) and palladium (Pd); and
wherein the capture region is arranged to contact the exhaust gas before the exhaust gas has contacted or passed through the catalytic region.

2. An oxidation catalyst according to claim 1, wherein the platinum group metal (PGM) is at least one of platinum (Pt) and palladium (Pd).

3. An oxidation catalyst according to claim 1, wherein the refractory oxide is selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

4. An oxidation catalyst according to claim 3, wherein the refractory oxide is alumina, silica or silica-alumina.

5. An oxidation catalyst according to claim 3, wherein the refractory oxide is titania.

6. An oxidation catalyst according to claim 1, wherein the capture region is a capture layer.

7. An oxidation catalyst according to claim 6, wherein the catalytic region is a catalytic layer, and wherein the capture layer is disposed on the catalytic layer, and the catalytic layer is disposed on the substrate.

8. An oxidation catalyst according to claim 6 wherein the catalytic region is a first catalytic zone and a second catalytic zone, and the capture layer is disposed on both the first catalytic zone and the second catalytic zone, and wherein the first catalytic zone and the second catalytic zone are disposed on the substrate.

9. An oxidation catalyst according to claim 1, wherein the capture region is a capture zone.

10. An oxidation catalyst according to claim 9, wherein the catalytic region is a catalytic layer, and the capture zone is disposed on the catalytic layer at an inlet end of the substrate.

11. An oxidation catalyst according to claim 9, wherein the catalytic region is a catalytic zone, wherein the catalytic zone is disposed at an outlet end of the substrate and the capture zone is disposed at an inlet end of the substrate.

12. An oxidation catalyst according to claim 1, wherein the substrate comprises an inlet end surface and an outlet end surface, and the capture region is a capture face, which is disposed on the inlet end surface.

13. An oxidation catalyst according to claim 12, wherein the capture face has a mean length from the inlet end surface of the substrate of <25 mm.

14. An oxidation catalyst according to claim 1, wherein the substrate is a flow-through monolith substrate.

15. An oxidation catalyst according to claim 1, wherein the substrate is a filtering monolith substrate, which is a wall-flow filter.

16. An oxidation catalyst according to claim 1, wherein the molecular sieve is selected from a small pore molecular sieve, a medium pore molecular sieve and a large pore molecular sieve.

17. An exhaust system for treating an exhaust gas produced by a diesel engine, wherein the exhaust system comprises an oxidation catalyst according to claim 1 and an emissions control device.

18. An exhaust system according to claim 17, wherein the oxidation catalyst is directly coupled to an exhaust manifold of the diesel engine.

19. An exhaust system according to claim 17 further comprising an emissions control device, which is a selective catalytic reduction catalyst or a selective catalytic reduction filter catalyst.

20. A method of capturing or trapping at least one phosphorus containing impurity and/or at least one sulfur containing impurity in an exhaust gas produced by a diesel engine, wherein the method comprises the step of passing an exhaust gas produced by a diesel engine through an exhaust system comprising an oxidation catalyst according to claim 1.

21. A method according to claim 20, wherein the diesel engine is run on biodiesel or on a fuel comprising >50 ppm of sulfur.

* * * * *